(12) United States Patent
Patodia et al.

(10) Patent No.: US 12,425,311 B2
(45) Date of Patent: Sep. 23, 2025

(54) DYNAMIC CREATION OF DATA SPECIFICATION-DRIVEN AI-BASED EXECUTABLE STRATEGIES FOR HIGH AVAILABILITY OF EVALUATION SERVICES

(71) Applicant: PAYPAL, INC., San Jose, CA (US)

(72) Inventors: Prabin Patodia, Bangalore (IN); Rajendra Bhat, Bangalore Urban (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/484,794

(22) Filed: Oct. 11, 2023

(65) Prior Publication Data
US 2025/0126029 A1    Apr. 17, 2025

(51) Int. Cl.
H04L 41/5009    (2022.01)
H04L 41/16    (2022.01)

(52) U.S. Cl.
CPC .......... *H04L 41/5012* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 7,966,366 B2* | 6/2011 | Alami | ................... | G06F 16/957 709/224 |
| 8,626,210 B2* | 1/2014 | Hicks, III | .............. | G08B 25/08 455/418 |
| 10,516,759 B2* | 12/2019 | Andrews | ............. | G06F 11/1464 |
| 12,124,870 B2* | 10/2024 | Zhu | ........................ | G06F 9/4881 |
| 2006/0259579 A1* | 11/2006 | Beverly | .................. | H04L 67/10 709/217 |
| 2008/0057907 A1* | 3/2008 | Yamakawa | ............. | G06F 21/31 455/411 |
| 2008/0250099 A1* | 10/2008 | Shen | ....................... | H04L 45/02 709/201 |
| 2009/0282095 A1* | 11/2009 | Alami | ................... | G06F 9/5027 709/224 |
| 2011/0004701 A1* | 1/2011 | Panda | ..................... | G06F 9/547 709/242 |
| 2012/0122418 A1* | 5/2012 | Hicks, III | ............... | H04W 4/12 455/404.1 |

(Continued)

*Primary Examiner* — Sandarva Khanal
(74) *Attorney, Agent, or Firm* — Haynes and Boone, LLP (70481)

(57) ABSTRACT

A service provider may create data specification-driven AI-based executable strategies, which may be used to ensure high uptime and availability of decision services. A service provider, such as an electronic transaction processor for digital transactions, may utilize different decision services that implement rules and artificial intelligence models for decision-making of data including data in production computing environment. A decision service may normally be used for data processing and decision-making. However, at certain times, the decision service may fail or the services and/or a gateway for such services may be inaccessible. To provide higher availability and better SLA times, a client-side executable strategy for decision service execution may be determined using the pathways for strategy execution and available data from called resources. This strategy may be loaded in parallel to calling the decision service, and when failure occurs, may be used as a fallback to request processing.

20 Claims, 7 Drawing Sheets

(56) References Cited

U.S. PATENT DOCUMENTS

| | | | | |
|---|---|---|---|---|
| 2017/0272309 A1* | 9/2017 | Ichihashi | ............... | H04L 67/10 |
| 2018/0139308 A1* | 5/2018 | Andrews | ............. | G06F 11/1464 |
| 2019/0394100 A1* | 12/2019 | Lamba | ................... | H04L 67/63 |
| 2022/0050751 A1* | 2/2022 | Hazra | ................. | G06F 11/3006 |
| 2022/0198283 A1* | 6/2022 | Patodia | .............. | G06F 16/2246 |
| 2022/0391420 A1* | 12/2022 | Quatro | .................. | G06N 20/00 |

\* cited by examiner

DYNAMIC CREATION OF DATA SPECIFICATION-DRIVEN AI-BASED EXECUTABLE STRATEGIES FOR HIGH AVAILABILITY OF EVALUATION SERVICES

TECHNICAL FIELD

The present application generally relates to calls for client-side execution of strategies during computing service failure and more particularly to intelligently generating strategies executable by client-side computing devices during such failures.

BACKGROUND

Users may utilize online service providers and corresponding computing systems and services to perform various computing operations and view available data through client computing devices of the users. Generally, these computing operations are provided by online platforms and systems, which may provide applications and services for account establishment and access, messaging and communications, electronic transaction processing, and other types of available services. During use of these service providers, the service provider may utilize one or more decision services that implement and utilize coded processing rules and/or artificial intelligence (AI) models for decision-making in real-time data processing, such as within a production computing environment. A particular decision service may be associated with providing decision-making operations within a production computing environment, such as live electronic transaction processing operations with an online transaction processor.

However, decision services in the production computing environment may fail or timeout, such as due to processing node timeout, application programming interface (API) failures or unresponsive calls, data processing or run-time errors, fraud or computing attacks that compromise the computing systems, or when other failure conditions occur. When the decision service fails, users and/or the service provider may be adversely affected by system errors and failures. For example, a user's transaction processing of an electronic transaction may fail and the user and/or service provider (e.g., online transaction processor) may incur loss. Further, failure of decision services may cause incomplete strategy execution, which may affect intelligent risk decisioning and other operations of automated computing systems and applications. While other decisions services may be made available, these may also fail and there is no way to guarantee 100% uptime and availability. As such, there exists a need for client-side execution of available strategies during decision service failure.

Figure 1:
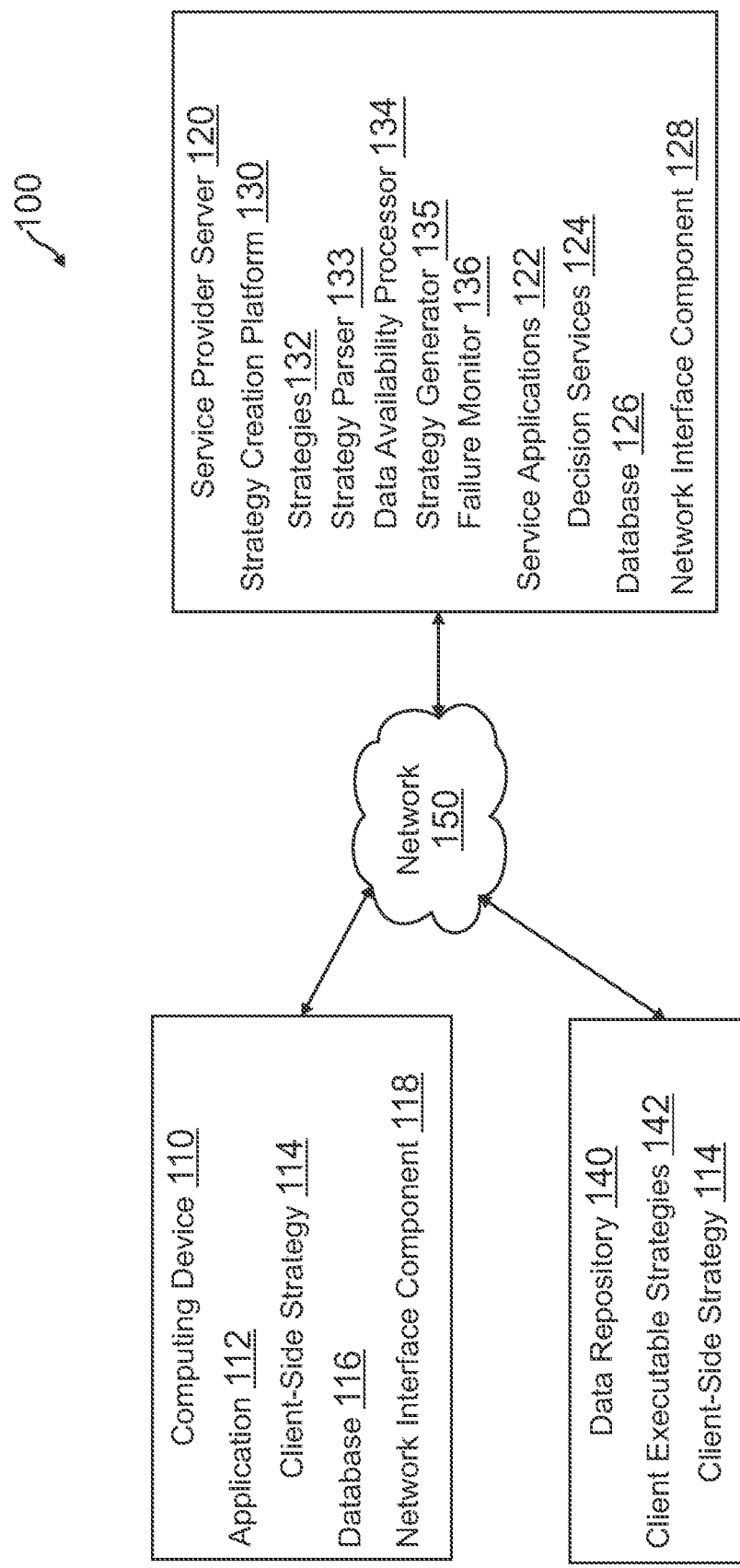
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for dynamic creation of data specification-driven AI-based executable strategies for high availability of evaluation services. Systems suitable for practicing methods of the present disclosure are also provided.

A service provider may provide different computing resources and services to users through different websites, resident applications (e.g., which may reside locally on a computing device), and/or other online platforms. When utilizing the services of a particular service provider, the service provider may provide decision services for implementing rules and intelligent decision-making operations with such services. Decisions services (e.g., microservices and/or other computing services for an application and computing architecture for one or more digital platforms and/or systems of the service provider) may, for example with an online transaction processor, provide services associated with electronic transaction processing, including account services, user authentication and verification, digital payments, risk analysis and compliance, and the like. These services may further implement automated and intelligent decision-making operations and engines, including data processing rule engines that automate decision-making based on rules designated for the systems. These decision services may be used for risk analysis, fraud detection, and the like to determine if, when, and how a particular service may be provided to users. For example, risk rules may be utilized with a risk engine for a decision service to determine if an indication of fraud is present in a digital transaction and payment, and therefore to determine whether to proceed with processing the transaction or instead decline the transaction (as well as additional operations, such as request further authentication and/or information for better risk analysis).

However, decisions services may fail or timeout due to data processing errors, computing attacks, and other events. Decision services may have strategies executable by such services when processing data, such as processing and responding to data processing requests from computing devices of users and/or other applications and systems. Strategies may correspond to steps in a workflow, such as receiving a data processing request, validating such request, loading data, responding to requests, and the like. As such, strategies are executable by the decision service to give decisions on input data and/or requests. Strategies may reside and/or be stored outside the decision services and be invoked during runtime of the decision services when the corresponding service executes a workflow (e.g., a processing graph or flow, such as a directed acyclic graph (DAG) or the like for processing operations); however, other configurations of the decision service or other computing service for strategy invocation and use during runtime and workflow execution may also be used. As such, strategies may also be storable by one or more data repositories, databases, cloud storage components, or the like.

Failure of decision services when executing a strategy may incur loss, fraud, and/or vulnerabilities to the service provider's system. For example, with an online transaction processor, a risk decisioning system may be an important component for payment processing and avoiding fraudulent transactions. Payment processing services interact with decision services and validate whether the transaction is fraudulent or not using such risk decision system. Generally, payment processing services may call risk services directly or via a gateway layer. However, the online transaction processor's system cannot guarantee 100% availability of such decision services, such as when failures occur, latency or network issues prevent or delay traffic, and the like. Even at 99.95% availability, when this is combined with gateway availability and other service availability that is less than 100%, a total number of failures may begin to amount to a high failure rate and/or loss. For example, with an online transaction processor, even 0.001% failure may contribute to thousands of failed transactions. Conventionally, the online transaction processor and/or other service providers may utilize fallback and/or stand-in decisioning system. However, maintaining such fallback systems is difficult and there is a cost and manual effort required. These fallback services may be unavailable for each decision service, and are also static in nature so that the fallback services may be unable to process, or provide poor results when processing, data on behalf of failed decision services.

As such, the service provider may provide executable strategies client-side to be performed by computing devices of users by and/or on such devices (e.g., through applications, clients, and the like on the device instead of at the service provider's decisioning systems, decision services, and/or other online applications and/or platforms). Such strategies may be generated by parsing and analyzing current strategies being used by a decision service and determining, when a computing device calls such computing service, which strategies may be invoked. The computing device may determine pathways of data processing (e.g., nodes in a data processing path or chain) that may be used for execution of the strategy using such client-side strategy packages. Each pathway may require data, which may correspond to individual nodes that process certain data. The data may be available and/or callable from different computing services and/or resources using an API specification of the decision service and available APIs of such services and/or resources. Based on the available data to be processed, certain pathways may be identified that can be progressed and/or traversed in order to execute the strategy. These may be bundled and/or stitched together in a new strategy that is executable client-side by computing devices of users. Once created, the new strategy may be pushed to a data repository for storage and/or use by the computing devices.

In this regard, a service provider, such as an online transaction processor may provide services to users, including electronic transaction processing, such as online transaction processors (e.g., PayPal®) that allows merchants, users, and other entities to processes transactions, provide payments, and/or transfer funds between these users. When interacting with the service provider, the user may process a particular transaction and transactional data to provide a payment to another user or a third-party for items or services. Moreover, the user may view other digital accounts and/or digital wallet information, including a transaction history and other payment information associated with the user's payment instruments and/or digital wallet. The user may also interact with the service provider to establish an account and other information for the user. In further embodiments, other service providers may also provide computing services, including social networking, microblogging, media sharing, messaging, business and consumer platforms, etc. These computing services and applications may be deployed across multiple different applications including different applications for different operating systems and/or device types. Furthermore, these services and applications may invoke and/or utilize the aforementioned decision services for strategy execution when processing data.

In various embodiments, in order to utilize the computing services of a service provider, an account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation, as well as purchase or subscribe to services of the service provider. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. Access and use of these accounts may be performed in conjunction with uses of the aforementioned decision services.

As such, when clients (e.g., computing devices of users) connect with and/or call computing services of service providers, decision services may be invoked to execute strategies in a workflow of data processes for a particular request, call, or the like. Prior to or when a computing device calls a decision service and/or the decision service is invoked to execute one or more strategies for processing a data processing request from the device, the service provider, application and/or computing system architecture, and/or decision service may determine that a specification-driven AI-based client executable strategy may be necessary or beneficial. Such client executable strategies may provide for client-side operations for executing a strategy on behalf of the decision service and/or service provider to provide a result used during data processing of requests and/or other workflow operations. The determination to generate such strategies may be based on a failure rate and/or threshold of the decision service, potential loss by failure, or other trigger, or, alternatively, may be performed when designated by one or more system administrators or the like.

As such, the service provider may determine client executable strategies that are to be generated from existing strategies of one or more decision services. For example, with a first strategy executable server-side by the decision service, the service provider may determine a new and/or second strategy corresponding to a client-side version of the strategy that is needed to be generated for a client executable strategy. The service provider may access the first strategy and parse the first strategy for pathways that lead to execution of the strategy. For example, different data processing nodes or operations may be required by the strategy, which may lead to a successful execution of the strategy and an output or result. Each node may be an action, activity, event, or executable operation/task to process data and provide a result for strategy execution. The strategy may have multiple pathways that may branch and lead to a decision or other output from executing the strategy, which may be parsed from the strategy and identified. As such, each strategy may include multiple pathways leading to execution and a result/output of the strategy.

By parsing the pathways, the service provider may determine required data by the nodes and/or operations in each pathway. The required data may correspond to a data load, object, or the like that is required from one or more other services or resources, such as data available from API calls performed using an API specification of the decision service and/or strategy. With the required data, the service provider may also use the API specification to determine which one of those API calls are available to be made, will be successful, and/or may result in retrieving and loading the required data by corresponding data processing nodes or operations in the pathways. Further, the available data may include other derived, determined, or inferred data using the known available data and one or more AI models or engines, such as an ML model or NN that predicts other available data from known available data. The available data therefore corresponds to a subset of the required data that is actually available to be used during strategy execution client-side, such as at a current time when the new, second, strategy is being identified and created from the pathways for execution of the first strategy.

As such, based on the available data and the required data by each of the pathways for strategy execution of the first strategy, the service provider may determine a subset of those pathways for the service that are available to be processed, executed, and/or completed in order to result is successful execution of the strategy and a result, output, decision, or the like. That subset of pathways may then be bundled and/or stitched together for a data package, object, container, or the like corresponding to the strategy. Further, the pathways and nodes/operations may be selected based on those available to be executed client-side and/or by the computing device(s) when the decision service, gateway, or other component of the service provider and/or application architecture fails. When determining the available data for executing the pathway(s) of the strategy, an AI-based model and engine may be used to determine derivations of data that can be used for the available data. For example, where the available data is only a current location and/or city of the user, a derivation may be a state or country including the location and/or city, which then correspond to the available data for use.

After creating the data structure or other object for the new strategy including one or more pathways for strategy execution using data processing nodes/operations that use and process available data, the service provider may store, in one or more data repositories and/or databases, the new strategy. This may include creating or generating the data package in a data repository, transmitting to a storage handler and/or the repository, and/or pushing to the repository, where the repository is accessible by computing devices that may interact with the decision service. Thus, on startup and/or refresh by a computing device of a connection, application, and/or operation that interacts with the decision service and/or application using the decision service, the computing device may access the data package, object, or the like for the strategy so that the strategy may be executed client-side by the computing device. The computing device may then continue to process data with the decision service while, in parallel, calling the new executable strategy. As such, when the gateway and/or decision service fails, the new executable strategy may be used for data processing and a result in place of the failed gateway and/or decision service. Results of executing the strategy may be used by the computing device and/or provided to the service provider for processing the computing device's request or other call and event. This provides a redundancy to such failures of decision services and higher availability of decision service data processing.

As such, the service provider may provide increased availability of decision services and other decisioning operations for a data processing system using these client-side executable strategies that are API and request specification-driven. This provides redundancy and further system robustness and flexibility in the event of system and/or component failures, API failures and/or unresponsive calls, computing attacks, and/or other issues faced by large complex computing systems and architectures. Further, the additionally provided availability decreases and/or prevents loss and failure of system usage, which allows for more accuracy and greater confidence in data processing results and system requests. As such, by providing a new strategy specifically generated for available data and to be executed client-side, the service provider may provide for improved computing systems and architectures that are more efficient, secure, and failure-tolerant.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a computing device 110, a service provider server 120, and a data repository 140 in communication over a network 150. Computing device 110 may be utilized by a user to access a computing service or resource provided by service provider server 120, where service provider server 120 may provide various data, operations, and other functions to computing device 110 via network 150 including those associated with applications and computing infrastructures that utilize decision services for decision-making during data processing. In this regard, computing device 110 may be used to access a website, application, or other platform that provides computing services. Service provider server 120 may provide computing services that process data and provide decisions in response to data processing requests via decision services, where service provider server 120 may provide fallback strategy execution by client-side computing device 110 by parsing strategies for available pathways that may execute such strategies.

Computing device 110, service provider server 120, and data repository 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Computing device 110 may be implemented as a communication device that may utilize appropriate hardware and software configured for wired and/or wireless communication with service provider server 120, data repository 140, and/or other devices or servers. For example, in one embodiment, computing device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Computing device 110 of FIG. 1 contains an application 112, a database 116, and a network interface component 118. Application 112 may correspond to executable processes, procedures, and/or applications with associated hardware. In other embodiments, computing device 110 may include additional or different modules having specialized hardware and/or software as required.

Application 112 may correspond to one or more processes to execute software modules and associated components of computing device 110 to provide features, services, and other operations for a user over network 150, which may include accessing and utilizing computing services provided by service provider server 120 and/or executing client-side strategies during decision service failures and/or unresponsive conditions. In this regard, application 112 may correspond to specialized software utilized by computing device 110 that may be used to access a website or application (e.g., mobile application, rich Internet application, or resident software application) that may display one or more user interfaces that allow for interaction with the computing services of service provider server 120. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information, presenting the website information to the user, and/or communicating information to the website. However, in other embodiments, application 112 may include a dedicated application of service provider server 120 or other entity.

Application 112 may be associated with account information, user financial information, and/or transaction histories. However, in further embodiments, different services may be provided via application 112, including social networking, media posting or sharing, microblogging, data browsing and searching, online shopping, and other services available through service provider server 120. Thus, application 112 may also correspond to different service applications and the like. When utilizing application 112 with service provider server 120, application 112 may request processing of a data processing request, such as by requesting data for processing and/or providing data with a request to process data and/or return a data processing result when utilizing one or more computing services of service provider server 120. The data processing request may correspond to account login, authentication, electronic transaction processing, and/or use of other services described herein. The data processing request may have a corresponding data load that is processed via one or more decision services of service provider server 120 to provide a decision that is used to provide a resulting output and result. As such, application 112 may be used with the decision services of service provider server 120.

However, such decision services may fail, and/or applications, components, and other computing services and platforms of service provider server 120 may become unresponsive, may fail, go offline, lag out, disconnect, suffer latency issues, or otherwise become unavailable. In such instances, application 112 may be used to execute a client-side strategy 114, which may be made available to computing device 110 from data repository 140. In this regard, client-side strategy 114 may be accessed and loaded on startup or refresh of application 112 and/or when an operation or process of application 112 is initiated to process data with service provider server 120, such as using one or more of service application 122, which may include data processing and decision outputs by decision services 124 of service provider server 120. Client-side strategy 114 may be executed and run in parallel on startup or refresh, and may then be used with available data to complete strategy execution when one or more of decision services 124 fail or become unresponsive. As such, application 112 may determine strategy outputs and executions based on client-side strategy 114.

In various embodiments, computing device 110 includes other applications as may be desired in particular embodiments to provide features to computing device 110. For example, these other applications may include security applications for implementing client-side security features, programmatic client applications for interfacing with appropriate application programming interfaces (APIs) over network 150, or other types of applications. Other applications on computing device 110 may also include email, texting, voice and IM applications that allow a user to send and receive emails, calls, texts, and other notifications through network 150. In various embodiments, the other applications may include financial applications, such as banking applications. Other applications may include social networking applications, media viewing, and/or merchant applications.

The other applications may also include other location detection applications, which may be used to determine a location for the user, such as a mapping, compass, and/or GPS application, which can include a specialized GPS receiver that determines location information for computing device 110. The other applications may include device interface applications and other display modules that may receive input from the user and/or output information to the user. For example, computing device 110 may contain software programs, executable by a processor, including a graphical user interface (GUI) configured to provide an interface to the user. The other applications may therefore use devices of computing device 110, such as display devices capable of displaying information to users and other output devices, including speakers.

Computing device 110 may further include database 116 stored on a transitory and/or non-transitory memory of computing device 110, which may store various applications and data and be utilized during execution of various modules of computing device 110. Database 116 may include, for example, identifiers such as operating system registry entries, cookies associated with application 112 and/or other applications 114, identifiers associated with hardware of computing device 110, or other appropriate identifiers, such as identifiers used for payment/user/device authentication or identification, which may be communicated as identifying the user/computing device 110 to service provider server 120. Moreover, database 116 may include data used for data processing request, such as data that may be provided to service provider server 120 for processing and strategy execution, or may be used with execution of client-side strategy 114.

Computing device 110 includes at least one network interface component 118 adapted to communicate with service provider server 120, data repository 140, and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services that utilize decision services for decision-making in an intelligent system to provide responses, output, and/or results to computing device 110 based on data processing requests. In this regard, service provider server 120 includes one or more processing applications which may be configured to interact with computing device 110, for example, to provide client-side strategies in data packages, code, files, or the like that are generated from parsing server-side and/or decision service usable strategies for viable pathways to execute based on available data. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a strategy creation platform 130, service applications 122, a database 126, and a network interface component 128. Strategy creation platform 130 and service applications 122 may correspond to executable processes, procedures, and/or applications with associated hardware. In other embodiments, service provider server 120 may include additional or different modules having specialized hardware and/or software as required.

Strategy creation platform 130 may correspond to a digital platform, software application and/or application architecture, or the like that may include one or more processes that execute modules and associated specialized hardware of service provider server 120 to determine client-side executable strategies based on decision service and/or server-side executable strategies and available data. In this regard, service applications 122 may correspond to specialized hardware and/or software that may access strategies 132 that may be created and deployed for execution by decision services 124 of service applications 122 during run-time and/or live production computing environment use for processing and serving data to users and computing devices, such as during use of computing services, applications, and the like. As such, strategies 132 may be used in order to execute decisions and provide outputs used to process data, such as those decisions and outputs that may be provided for account services, account setup, authentication, electronic transaction processing, and other computing services.

However, and as further discussed herein, one or more of decision services 124 may fail, which normally would result in failure of data processing and completion of requests from devices and servers, such as computing device 110. This may also adversely affect other systems, such as risk decisioning and the like, which may result in loss. As such, strategy creation platform 130 may implement and utilize operations, components, and data structures for client-side strategy executions that allow clients and user computing devices (e.g., computing device 110) to execute available pathways for completion and/or strategy execution of strategies 132. For example, strategy creation platform 130 may utilize a strategy parser 133 to determine all pathways that may be traversed and/or iterated through during strategy execution by one or more of decision services 124, such as to provide a result, output, or decision from strategy execution. Such outputs may be used when processing requests from clients, devices, and servers, such as when determine a response to a data processing request.

Strategy parser 133 may operate by determine all (or a subset of all) viable pathways for different data processing nodes, data loading or processing events, and the like that may be required to successfully process and complete execution of a strategy by a corresponding one of decision services 124 during execution. As such, each of strategies 132 may have one or more pathways that may lead to successful execution, where multiple pathways for a strategy may have their own corresponding required data. The required data may correspond that the data that is utilized by the nodes, processors, or events in a pathway for strategy execution that may result in successful execution of the strategy. As such, when the required data is not available or cannot be called, retrieved, and/or loaded, such pathway may be unavailable to successfully execute the corresponding one of strategies 132. Thus, once pathways to strategies 132 are determined by strategy parser 133, the required data may be matched to the available data to determine a subset of all the pathways leading to strategy execution that are actually available to be executed and used. Strategy parser 133 may correspond to operations, AI engines, and the like that may iterate through the options and pathways to a strategy to determine the manners in which a strategy may be successfully executed and required data for each manners (e.g., pathways).

In order to determine the subset of pathways actually available for strategy execution, data availability processor 134 may be invoked, executed, and utilized by strategy creation platform 130 to determine available data for strategy execution. The available data may correspond to data that is actually available by calling one or more resources, such as through API requests for data that may return API responses of the data, as well as derived data that may be determined from the actually available data. For example, available data may be determined by data availability processor 134 executing one or more calls, pings, or the like to determine whether corresponding resources are online, available, and/or responsive to load data required by a node or event in a pathway for strategy execution. Further, data availability processor 134 may also determine derivative data that may be derived from such data that may be directly retrieved, such as using an AI engine including a rules-based, ML model-based, and/or NN-based system for deriving such data. This data derived from real available data may correspond to intelligent assumptions or determinations from the data, such as a region a user or event may be located from an actual location or address of that user or event. Data availability processor 134 may utilize rules and/or a rule-based engine for determining whether a data may be derived, as well as what that derived data may be, using rules and data that may be retrieved from one or more other resources (e.g., databases, applications, computing devices or other endpoints, etc.).

In further embodiments, data availability processor 134 may include AI models, such as machine learning (ML) or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships. Generally, NN models may include deep learning models and the like, and may correspond to a subset of ML models that attempt to mimic human thinking by utilizing an assortment of different algorithms to model data through different graphs of neurons, where neurons include nodes of data representations based on the algorithms that may interconnect different nodes using mathematical relationships. ML models may similarly utilize one or more of these mathematical models, and similarly generate layers and connected nodes between layers in a similar manner to neurons of NN models.

When building ML models for data availability processor 134, training data may be used to generate one or more classifiers and provide recommendations, predictions, or other outputs based on those classifications and an ML model. The training data may be used to determine input features for generating predictive scores for data derivations, such as what data may be inferred or assumed from known data and/or actually available data, and what data may not be inferred or assumed. For example, ML models for data availability processor 134 may include one or more layers, including an input layer, a hidden layer, and an output layer having one or more nodes; however, different layers may also be utilized. As many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models for data availability processor 134.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models for data availability processor 134 that attempt to classify whether additional available data may be derived from known and available data. Thus, when ML models for data availability processor 134 are used to perform a predictive analysis and output, the input may provide a corresponding output based on the classifications trained for ML models for data availability processor 134.

ML models for data availability processor 134 may be trained by using training data associated with past known and/or derived data, labels to known and derived data, as well as the aforementioned features for strategy execution by different pathways (e.g., required data by different nodes in processing pathways and what may be used to provide a successful strategy execution). By providing training data to train ML models for data availability processor 134, the nodes in the hidden layer may be trained (adjusted) such that an optimal output (e.g., a classification within an accuracy threshold) is produced in the output layer based on the training data. By continuously providing different sets of training data, and with NNs penalizing such NNs when the output of ML models for data availability processor 134 is incorrect, ML models and/or NNs for data availability processor 134 (and specifically, the representations of the nodes in the hidden layer) may be trained (adjusted) to improve its accuracy performance in data classification. Adjusting ML models and/or NNs for data availability processor 134 may include adjusting the weights associated with each node in the hidden layer. Thus, the training data may be used as input/output data sets that allow for ML models and/or NNs for data availability processor 134 to make classifications based on input attributes. The output classifications for an ML model or NN trained for data availability processor 134 may be determinations of data that may be derived from known available data.

As such, the available data may also be determined programmatically and/or intelligently using one or more AI systems and/or models, such as ML models and/or NNs. Based on the available data, strategy generator 135 may generate corresponding strategy execution packages for client-side execution of strategies 132 in the event of failure, unresponsiveness, latency, or the like of decision services 124. In this regard, strategy generator 135 may take, as input, all (or a portion of) pathways for execution of strategies 132 and the available data (including known and derived data) and output a subset of pathways that may be validly and successfully executed in the event that one or more of decision services 124 fail. The subset of pathways may include one or more pathways that proceed from start to finish through data processing nodes, events, or processor, and result in a successful execution of a corresponding one of strategies 132.

Once determined, such subsets of pathways may be packaged into data packages, code, and/or files for client executable strategies 142 (including client-side strategy 114), which may be created and pushed to and/or stored by data repository 140. These may then be made available to different client and computing devices for client-side execution, such as computing device 110 executing client-side strategy 114. Failure monitor 136 may then be used to monitor the health and/or availability of decision services 124. As such, when one or more of decision services 124 fail, failure monitor 136 may detect such failure. Failure detection and/or execution of client executable strategies 142 may also or instead be determined by corresponding clients and devices. Client executable strategies 142 may be execute in parallel to use of decision services 124 to execute strategies 132, which may then be invoked when decision services 124 fail and/or a detection of failure or conditions for failure are determined by failure monitor 136. The operations and components used to generate and deploy client executable strategies 142 to data repository 140, as well as update client executable strategies 142 and/or determine decision service health and availability using failure monitor 126, are described in further detail below with regard to FIGS. 2-4.

Service applications 122 may correspond to one or more processes to execute modules and associated specialized hardware of service provider server 120 to provide computing services for account usage, digital electronic communications, electronic transaction processing, and the like. In this regard, service applications 122 may correspond to specialized hardware and/or software used by service provider server 120 to provide, such as to a user associated with computing device 110, one or more computing services, which in turn utilize decision services 124 and/or other microservices for decision-making during runtime. Service applications 122 may correspond to electronic transaction processing, account, messaging, social networking, media posting or sharing, microblogging, data browsing and searching, online shopping, and other services available through service provider server 120. Service applications 122 may be used by a user to establish an account and/or digital wallet, which may be accessible through one or more user interfaces, as well as view data and otherwise interact with the computing services of service provider server 120. In various embodiments, financial information may be stored to the account, such as account/card numbers and information. A digital token or other account for the account/wallet may be used to send and process payments, for example, through an interface provided by service provider server 120. The payment account may be accessed and/or used through a browser application and/or dedicated payment application, which may provide user interfaces for use of the computing services of service applications 122.

The computing services may be accessed and/or used through a browser application and/or dedicated payment application executed by computing device 110, such as application 112 that displays UIs from service provider server 120. Such account services, account setup, authentication, electronic transaction processing, and other computing services of service applications 122 may utilize decision services 124, such as for authentication, electronic transaction processing, risk analysis, fraud detection, and the other decision-making and data processing required by the aforementioned computing services. Decision services 124 may execute using strategies 132, which may be accessed and loaded to one or more of decision services 124 during run-time and/or live computing event and request processing in a production computing environment. Decision services 124 may correspond to decision services used for decision-making using rules-based and/or AI models and engines when executing strategies 132 for decisions, responses, and other outputs. Decision services 124 may execute strategies 132 based on one or more pathways of corresponding data processing nodes and/or events that are performed for successful strategy execution. In this regard, when decision services 124 fail, client executable strategies 142 may be used for fallback strategy execution client-side, such as by having computing device 110 execute client-side strategy 114.

Additionally, service provider server 120 includes database 126. Database 126 may store various identifiers associated with computing device 110. Database 126 may also store account data, including payment instruments and authentication credentials, as well as transaction processing histories and data for processed transactions. Database 126 may store financial information and tokenization data. Database 126 may further store strategies 132 and/or information used for execution of strategies 132. For example, database 126 may include or correspond to a strategy storage repository where deployed strategies may be accessed and utilized by decision services 124 for execution of a strategy during decision-making and/or outputs. Further, data derived from strategies 132 and/or available data, including all pathways parsed or traversed for strategies 132, derived data from available, and/or subsets of all the pathways based on available and derived data, may be stored by database 126.

In various embodiments, service provider server 120 includes at least one network interface component 128 adapted to communicate computing device 110 and/or other devices and servers over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
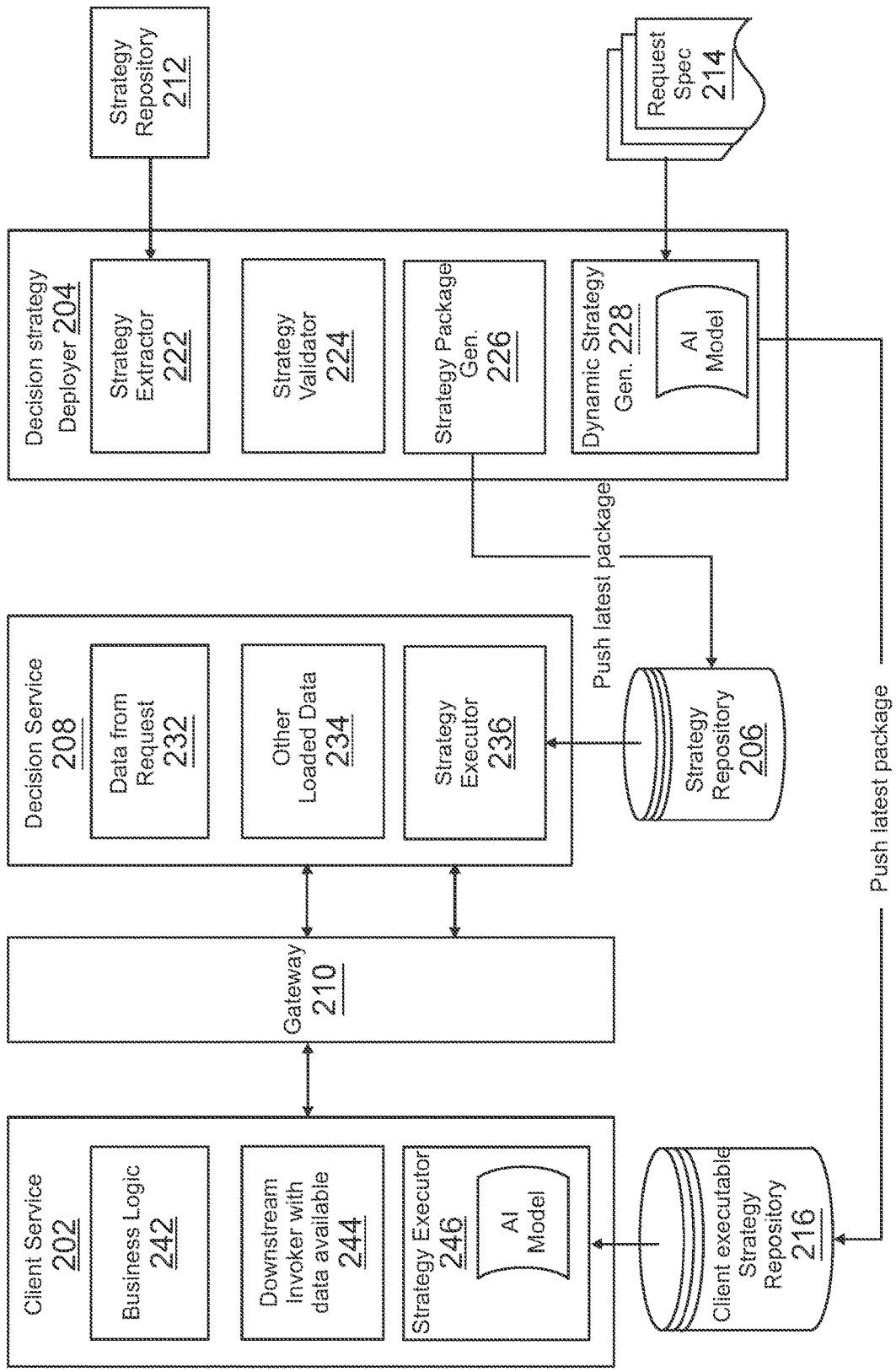
FIG. 2 is an exemplary system environment where a strategy may be parsed and processed to provide pathways for strategy execution client-side based on available data, according to an embodiment.

FIG. 2 is an exemplary system environment 200 where a strategy may be parsed and processed to provide pathways for strategy execution at a client-side device based on available data, according to an embodiment. System environment 200 of FIG. 2 includes a client 202 that may correspond to a client-side application, operating system, and/or other components and operations of computing device 110 discussed in reference to system 100 of FIG. 1. In this regard, client 202 may execute client-side strategies determined by a decision strategy deployer 204 and pushed as packages to a strategy repository 206. As such, client 202 may interact with a decision service 208 through a gateway 210, which may be provided by service provider server 120 in system 100 (e.g., decisions services 124), to utilize decision service 208 for strategy execution or execute a client-side strategy from strategy repository 206 in the event that decision service 208 and/or gateway 210 fail.

In system environment 200, prior to or on initiation of an interaction and/or request by client 202 to gateway 210 for decision service 208, decision strategy deployer 204 may be used to create strategy data packages pushed to and/or stored by strategy repository 206 for availability to and use by client 202. For example, client 202 may request data processing, such as by providing one or more data loads to a computing application, platform, or service using decision service 208 that requires action from a service provider. Thus, decision service 208 may be invoked in order to process a data processing request and provide a decision used when responding to client 202. However, decision service 208 and/or gateway 210 may fail or be predicted to fail (e.g., timeout or provide insufficient accuracy for decision-making). As such, decision strategy deployer 204 may be used to provide fallback and redundancy during the failures through these client-side executable data packages for strategies created from parsing strategy execution pathways and determining those pathways that may be executed depending on available data for processing nodes or operations in each pathway to successful strategy execution.

As such, decision strategy deployer 204 may interact with a strategy repository 212 that stores or houses data for strategies executed by different decision services of service provider server 120, such as decision service 208. Decision strategy deployer 204 may also use API specifications 214 that correspond to the API requests and other calls executed by decision services during strategy execution to obtain and/or load data used by data processing nodes to successful execute a strategy. As such, strategy repository 212 may provide a strategy that may have corresponding nodes in pathways that use required data that may be obtained through API requests and calls designated by API specifications 214.

Decision strategy deployer 204 may include a strategy extractor 222 that parses a strategy and determines the pathways to successful execution and performance of the strategy be decision service 208, which may correspond to the different pathways for strategy execution, each having one or more data processing nodes, operations, or events required to be performed. The required data for those nodes may be obtained through API requests used or designated for decision service 208 using API specification 214. Strategy extractor 222 may therefore determine the pathways and the required data for each pathway using data from strategy repository 212 and API specification 214, and a strategy validator 224 may then validate the strategy's pathways and required data. Strategy validator 224 may then provide the strategy and required data to a dynamic strategy generator 228 for determination of a strategy package that may be executed client-side in the event of failure of decision service 208 and/or gateway 210.

As such, dynamic strategy generator 228 may determine pathways that may be executed client-side when decision service 208 and/or gateway 210 are unavailable. Dynamic strategy generator 228 may determine what data is actually available to be used by client 202 during strategy execution. This may correspond to known available data, which may be directly called, requested, and/or obtained using API requests from API specifications 214. Further, the data may correspond to derived, forecasted, and/or predicted data based on the known data, where an AI model of dynamic strategy generator 228 may determine such derivations of known data using rules, ML models, and/or NNs. For example, a rule-based, ML, or NN model may be used to derive data based on training and past data derivations. Dynamic strategy generator 228 may further determine a subset of those pathways, such as one or more pathways for strategy execution, that may actually be completed based on the available data. For example, by matching or correlating the available data to the required data for pathways, certain pathways may be identified as being able to be successfully traversed, processed, and/or completed. A strategy package generator 226 may then bundle the group of these pathways include a data package, such as a data container, file, object, or the like. Once created, strategy package generator 226 may push the latest package for a strategy to strategy repository 206 and a client executable strategy repository 216 for storage, or otherwise store once generated.

Strategy repository 206 may therefore store strategies and the corresponding client-side executable strategies used by client 202 during failure or inaccessibility of decision service 208 and/or gateway 210. In this regard, decision service 208 that receive a request, such as an API call for a data processing request that may include or designate a data load, from client 202. On startup, refresh, or other initiation of client 202 with decision service 208, the client-side executable strategy may be pushed, loaded, or otherwise provided to client 202. When available, decision service 208 may process request data 232 with other loaded data 234 using a strategy executor 236. This may correspond to standard functionality of decision service 208 to return a result of request processing from strategy execution of a strategy using strategy executor 236 with request data 232 and other loaded data 234.

However, when decision service 208 and/or gateway 210 fail or are unavailable, client 202 may fall back to a redundancy position where the client-side executable package is utilized. As such, client executable strategy repository 216 may be used to provide to client 202 the client-side executable strategy having the subset of pathways that may be utilized for strategy execution using available data. Client 202 may use business logic 242 to determine when decision service 208 and/or gateway 210 has failed, such as in response to a timeout or unresponsive API calls after an amount of time, and may use a downstream invoker for available data 244 to obtain the available data for the client-side executable strategy identified in the data package from client executable strategy repository 216. A strategy executor 246 for client 202 may then be used for strategy execution, which may include an AI model configured to determine a pathway to successful strategy execution using the available data and make risk and other decisions for strategy execution.

Figure 3A:
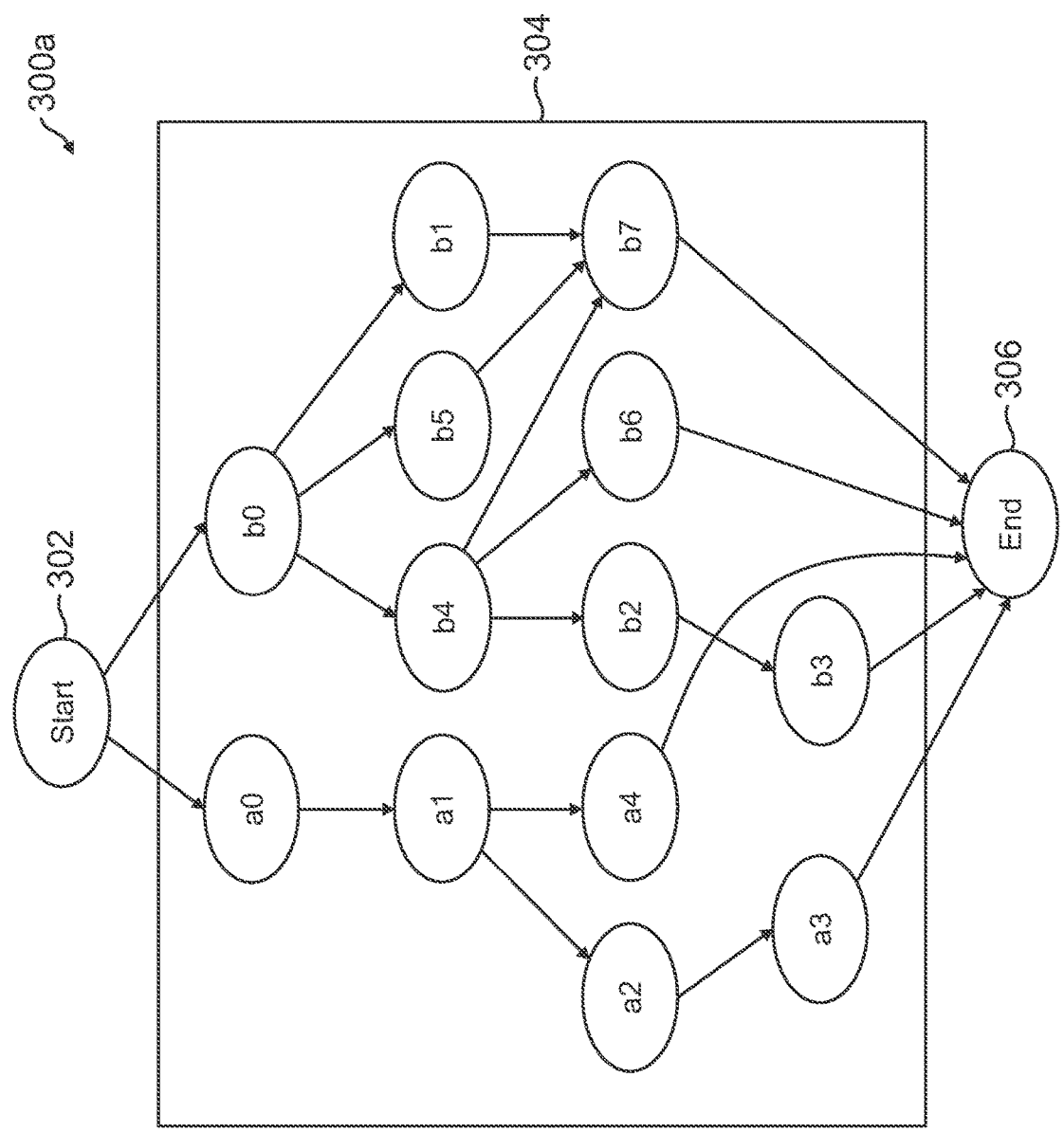
FIGS. 3A-3C are exemplary diagrams of a strategy that is parsed for pathways so that a client-side executable strategy package may be generated and deployed for use in decision service failover conditions, according to an embodiment.
Figure 3B:
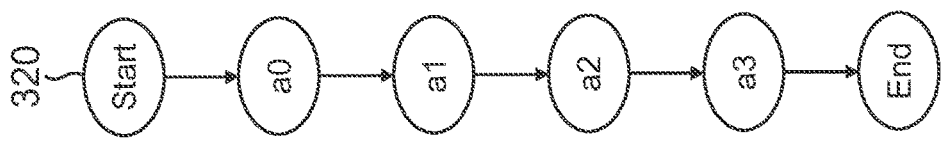
Figure 3B:
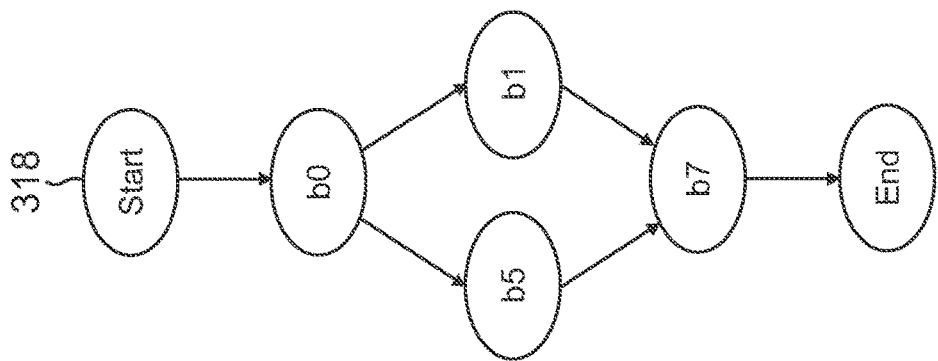
Figure 3B:
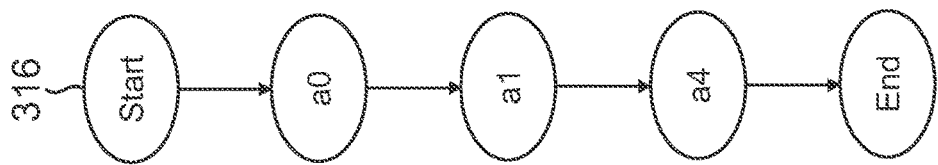
Figure 3B:
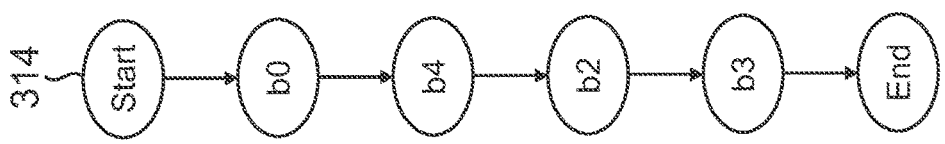
Figure 3B:
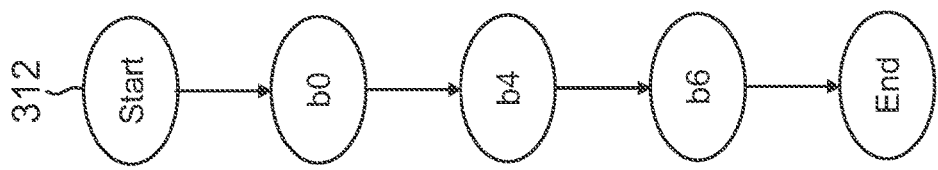
Figure 3C:
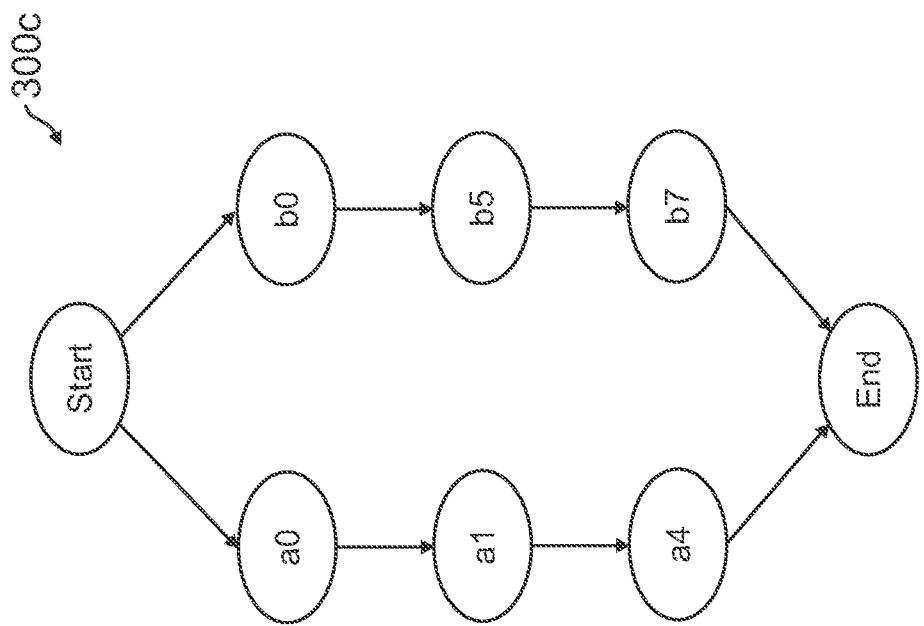

FIGS. 3A-3C are exemplary diagrams 300a-c of a strategy that is parsed for pathways so that a client-side executable strategy package may be generated and deployed for use in decision service failover conditions, according to an embodiment. The strategy depicted in FIGS. 3A-3C parses and determines all (or a portion of) pathways and then identifies those pathways that may be used based on available data for strategy execution. As such, the strategy may be processed by service provider server 120 and a client-side executable strategy may be provided from such strategy to computing device 110 via data repository 140, as discussed in reference to system 100 of FIG. 1.

For example, FIG. 3A is an exemplary diagram 300a of a full strategy where all corresponding pathways are parsed or traversed for strategy execution. For example, the strategy may include a start point 302, which corresponds to a start for a decision service to begin strategy processing, such as using a data load for a request. Start point 302 may then branch into different pathways 304 for strategy execution. Each of pathways 304 has corresponding nodes or vertices shown in diagram 300a, where these nodes may correspond to data loads, operations, events, or the like that occur during pathway traversal or execution to provide a resulting output of the strategy. As such, pathways 304 then converge again at an end point 306, which correspond to successful strategy execution and an output decision or result of strategy execution by the corresponding decision service.

In diagram 300b of FIG. 3B, the pathways parsed from the strategy shown in diagram 300a are shown. Each pathway is individually represented as pathways 312-320. For example, pathway 312, pathway 314, pathway 316, pathway 318, and pathway 320 each have corresponding nodes shown in a0-a4 and b0-b7. When a pathway is executed and/or proceed through to a traversal from a start point to an endpoint, one or more corresponding nodes of a0-a4 and/or b0-b7 are used to load data, process data, and/or execute an operation using such data, which results in strategy execution. As such, nodes a0-a4 and b0-b7 may correspond to the required data for strategy execution using each of pathways 312-320. The required data may therefore correspond to that data required to be loaded, processed, or used by nodes a0-a4 and/or b0-b7 for strategy execution and therefore be identified as needed to successfully execute the strategy.

However, not all of the required data may be available or callable/retrievable (e.g., using one or more API calls or requests). As such, one or more of nodes a0-a4 and/or b0-b7 may not be capable of being processed, which may limit use of pathways 312-320 to only certain pathways for strategy execution. Data availability may be limited to those API requests that may be processed and are responsive, which may be based on service or resource availability, latency, and the like. This may also be limited based on client-side API requests or calls that are available, permissions, and responsiveness of APIs and resources to client calls. For example, only nodes a0, a1, a4, b0, b5, and b7 may have available data to a client during a client-side strategy execution. As such, use of pathways 312-320 may be limited to those pathways using nodes a0, a1, a4, b0, b5, and b7.

In diagram 300c of FIG. 3C, a data package is shown for a client-side executable strategy having two pathways that may be successfully traversed, processed, and/or completed from the strategy and strategy pathways in diagrams 300a and 300b. For example, based on available data for nodes a0, a1, a4, b0, b5, and b7, pathways 316 and 318 (specifically the left branch of pathway 318) may be used for strategy execution. As such, pathways 316 and 318 may be bundled and/or stitched together in a new strategy package that may be used for client-side execution of the corresponding strategy. A data package may therefore be generated for pathways 316 and 318 and stored in a data repository that may be accessible and available to clients. As such, when clients startup, refresh, or otherwise use a corresponding decision service, the data package for pathways 316 and 318 may be loaded in parallel and used for redundancy during failover as a fallback mechanism for strategy execution.

Figure 4:
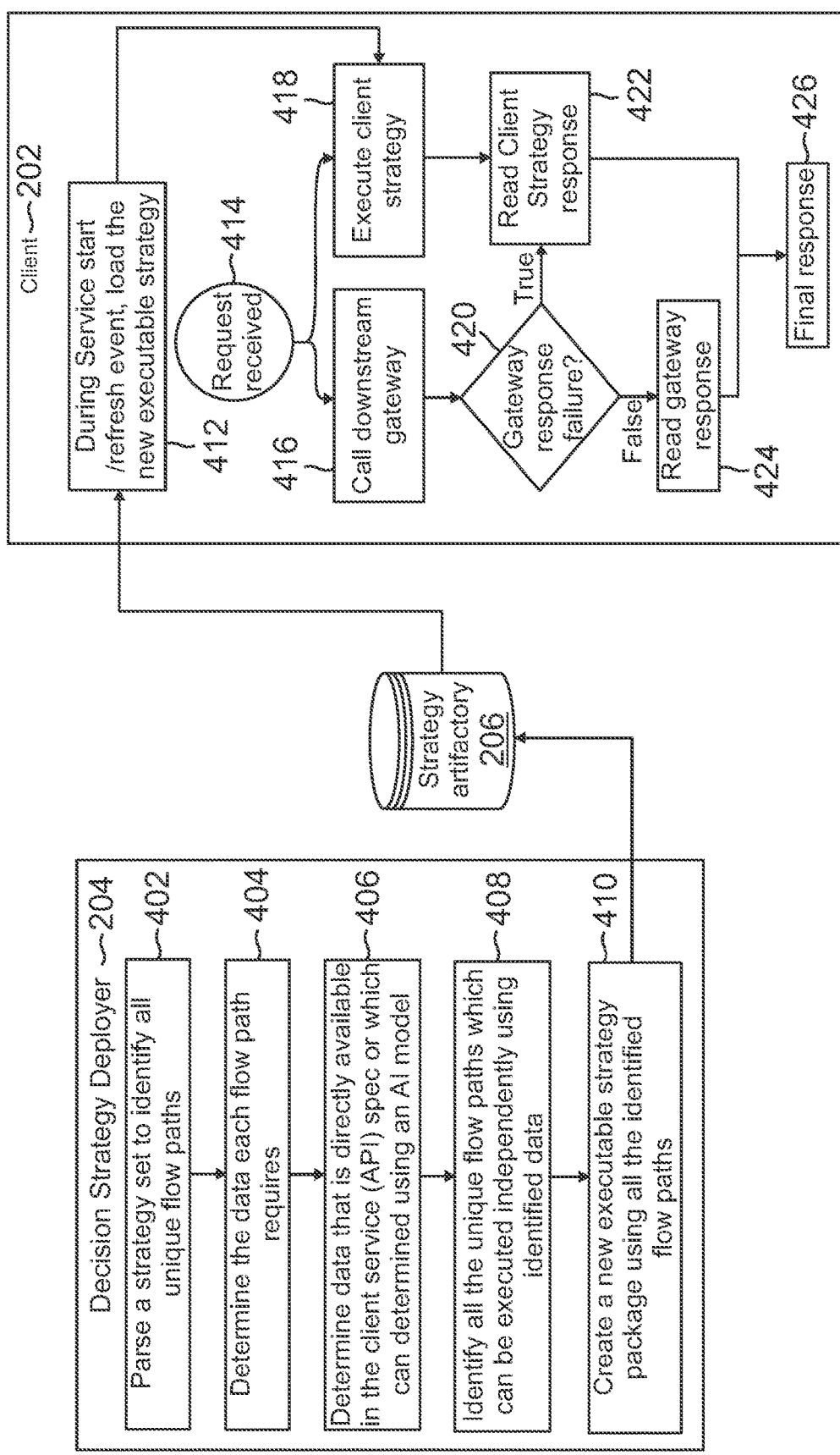
FIG. 4 is a flowchart of an exemplary process for dynamic creation of data specification-driven AI-based executable strategies for high availability of evaluation services, according to an embodiment.

FIG. 4 is a flowchart 400 of an exemplary process for dynamic creation of data specification-driven AI-based executable strategies for high availability of evaluation services, according to an embodiment. Note that one or more steps, processes, and methods described herein of flowchart 400 may be omitted, performed in a different sequence, or combined as desired or appropriate.

Flowchart 400 in FIG. 4 includes steps executed by client 202 and decision strategy deployer 204 using strategy repository 206. As such, different portions of the steps of flowchart 400 are shown as being performed by, on, or with client 202, decision strategy deployer 204, and/or strategy repository 206. At step 402 of flowchart 400, a strategy is parsed to identify all unique flow paths of the strategy, such as all pathways for strategy execution. In this regard, a flow chart, processing flow, node and/or processing operation/event graph, or the like may be traversed and/or iterated through to identify the possible flow paths or pathways that may be used to successfully complete or execute a strategy and return a decision or output. This process may identify and provide a list or set of different pathways, each of which include one or more data processing nodes, events, or operations that load and/or process data used for strategy execution.

At step 404, the data each flow path requires is determined. For example, each flow path or pathway may include one or more nodes, which require data from a data load, call to an internal or external resource (e.g., application database, etc.), or output from a previous node or other data processing operation. The required data for a pathway may therefore determine what the calls and operations are to be performed when proceeding through a pathway to successful strategy completion or execution. However, not all of this data may be available, such as due to offline, failed, or inaccessible resources, data call failures, latency issues, and the like. As such, at step 406, the data that is directly available in the client service (e.g., based on the API specification) or which can be determined using an AI model is determined. Actual and known available data may correspond to the data that may be determined through direct calls and/or loading operations that may be successfully determined. As such, a data caller may be used to determine what calls and/or data loads may be successfully performed from other resources to obtain available data.

However, other data may be derived, predicted, created, or otherwise determined using the known data and one or more AI engines, models, or operations. For example, an AI engine may derive data from known data by making assumptions or inferences based on the known data and one or more learned characteristics or features of such data. In this regard, locations may be inferred or derived from more granular locations, times may be inferred from events occurring between other events at known times, and the like. As such, an AI engine may be used to determine other available data. At step 408, all the unique flow paths which can be executed independently using the identified data are identified. By matching the available data to the required data for the parsed pathways, those pathways that may be successfully traversed and processed may be determined, such as by having available data for each data processing node's required data in the pathway. At step 410, a new executable strategy package is created using all the identified flow paths. Once the subset of pathways that may be successfully completed using the available data is determined, a new data structure or package may be created to include this subset of pathways for strategy execution.

These new strategy packages may then be stored to strategy repository 206, such as using a push to the corresponding data repository for strategy repository 206. Thereafter an event may be triggered to users and their corresponding devices, such as client 202, to load such strategy packages. As such, at step 412, during a decision service start and/or refresh event, such as a startup, use of, and/or refreshing of an application executed by client 202 that interacts with the decision service, the new executable strategy is loaded to client 202 using the package from strategy repository 206.

At step 414, a request is received by client 202, which may correspond to a data processing request using the aforementioned decision service. The request may therefore include input and/or a data load or may include specific data for processing and a desired response from the service provider and/or decision service being called. However, to account for service failures, gateway and/or service unresponsiveness, or the like, the client-side executable strategy may be loaded and made available as a fallback strategy execution. As such, the new executable strategy may be executed in parallel to calls made to the decision service to process the request. For example, at step 416, the downstream gateway for the decision service is called by client 202. Simultaneously or concurrently, the client strategy is executed, at step 418. At step 420 it is determined if the gateway response failed, and therefore if the decision service failed, is unresponsive (e.g., due to gateway and/or service issues, processing errors, etc.), or the like.

If true, then at step 422, the client strategy response is read, such as a result of processing the strategy using one of the available pathways for strategy execution using the available or derived data. Such strategy execution may occur client-side by client 202 instead of server-side by the decision service such that the gateway response from step 420 is not required by client 202 to proceed with request processing. However, if it is false that the gateway response failed at step 420, for example, when a gateway response is received, then at step 424, the gateway response may instead be read. This may supersede reading the response from the client-side strategy execution so that decisioning and outputs by the decision service's execution of the strategy may be prioritized. Using either the read response from the client-side strategy execution at step 422 or the server-side strategy execution by the decision service at step 424, a final response to the strategy execution and/or request processing may be determined by client 202. This may allow for proceeding through request processing and providing a result or output in a corresponding application for client 202.

Figure 5:
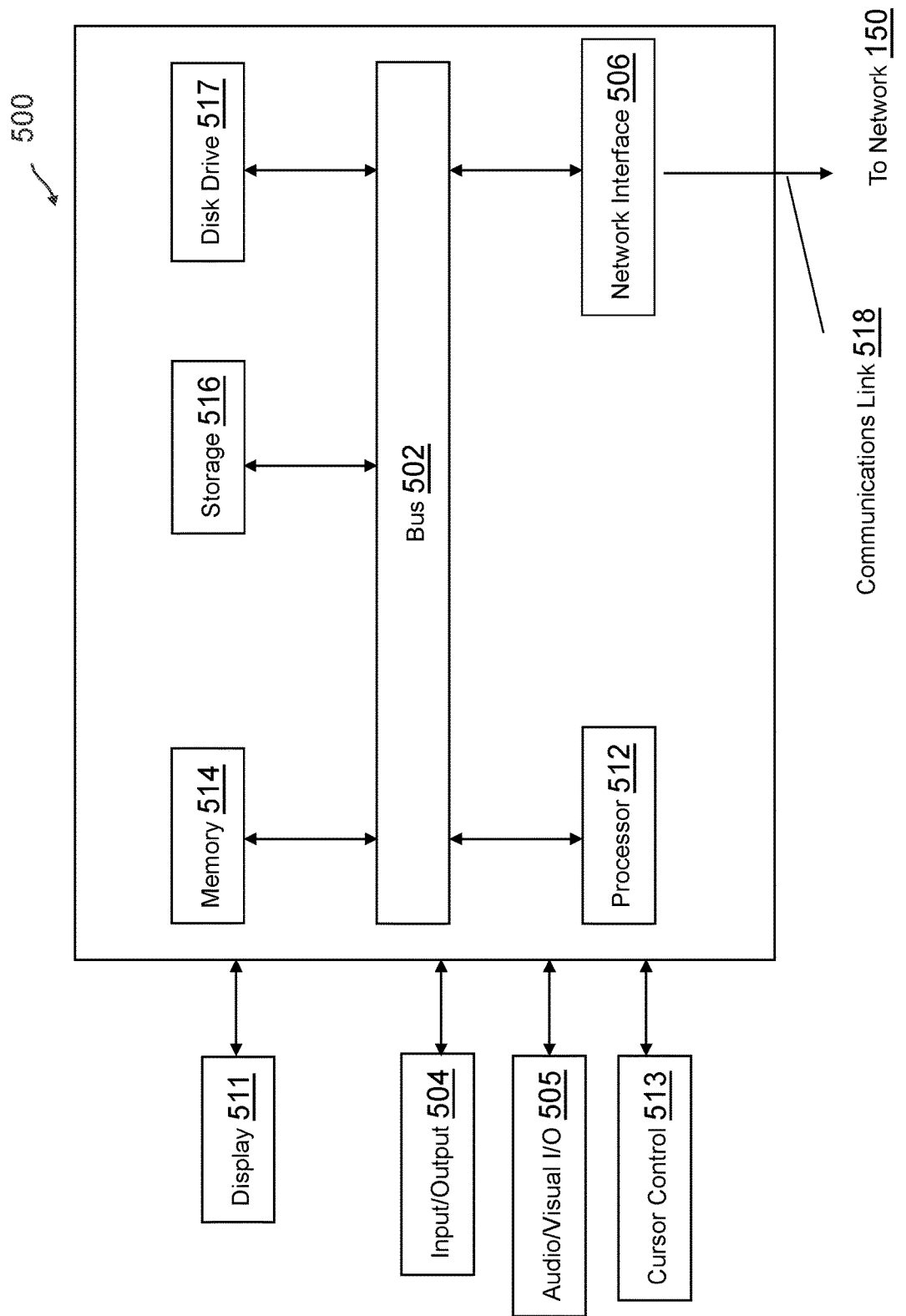
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
   a non-transitory memory; and
   one or more hardware processors coupled to the non-transitory memory and configured to read instructions from the non-transitory memory to cause the service provider system to perform operations comprising:
      parsing a strategy utilized for processing a data processing request from a computing device by a decision service of the service provider system, wherein the strategy comprises a plurality of pathways for an execution of the strategy, each of the plurality of pathways including one or more data processing nodes for required data by each of the plurality of pathways during the execution of the strategy;
      determining, based on the parsing, the required data for each of the plurality of pathways;
      determining available data to the decision service from one or more additional services that are callable using an application programming interface (API) specification associated with the decision service;
      identifying a first pathway of the plurality of pathways available to be used for the strategy based on the available data and the required data for each of the plurality of pathways;
      creating a new strategy executable client-side by the computing device during a failure associated with the decision service at the service provider system;
      storing the new strategy in a data repository available to the computing device;
      determining the failure of the decision service has occurred;
      receiving, from the computing device, a result of processing the new strategy client-side by the computing device, wherein the result is determined using an artificial intelligence (AI) model for an application on the computing device; and
      processing the data processing request by the decision service using at least the result.

2. The service provider system of claim 1, wherein the operations further comprise:
   determining a second pathway of the plurality of pathways available to be used for the strategy based on the available data and the required data,
   wherein the new strategy is created to include the first pathway and the second pathway as alternate pathways for processing the new strategy by the computing device in place of the decision service processing the strategy.

3. The service provider system of claim 1, wherein the processing the data processing request by the decision service using at least the result comprises continuing with a pathway that executes the strategy after completing one or more nodes in the pathway using the result from the computing device.

4. The service provider system of claim 1, wherein the storing the new strategy comprises:
   packaging the new strategy in a data structure storable by the data repository, wherein the packaging includes stitching the first pathway with any second pathways available to be used for the strategy based on the available data and the required data.

5. The service provider system of claim 1, wherein the storing the new strategy is in response to one of an initiation of the decision service or a refresh of the decision service with an application on the computing device.

6. The service provider system of claim 1, wherein, prior to the determining the failure of the decision service has occurred, the operations further comprise:
   receiving the data processing request;
   initiating a processing the data processing request using at least the strategy with the decision service prior to the failure of the decision service occurring, wherein the initiating the processing begins a first one of the plurality of pathways for processing the data processing request, and wherein at least one of the one or more data processing nodes in the first one of the plurality of pathways is completed by the result of processing the new strategy client-side after the failure has occurred.

7. The service provider system of claim 1, wherein the determining the available data comprises:
   executing one or more API calls to the one or more additional services using the API specification;
   determining if any of the one or more API calls fails or is unresponsive; and
   updating a list of callable services for the one or more additional services based on the determining if any of the one or more API calls fails or is unresponsive.

8. The service provider system of claim 1, wherein the determining the available data includes deriving at least a portion of the available data using the AI model of the service provider system from data available via calling the one or more additional services.

9. The service provider system of claim 1, wherein the decision service comprises a decision service or a microservice of a service-based application architecture for the service provider system.

10. A method comprising:
    determining, by parsing a first strategy executable by a decision service of a service provider, a plurality of pathways used when executing the first strategy by the decision service and required data for each of the plurality of pathways, wherein each of the plurality of pathways includes one or more data processing nodes of the required data;
    determining available data from one or more computing resources that are callable using an application programming interface (API) specification associated with the decision service, wherein the available data is used by the one or more data processing nodes when executing the first strategy;
    generating, based on the available data and the required data by each of the plurality of pathways, a second strategy from the first strategy, wherein the second strategy is executable by a plurality of computing devices client-side during a failure associated with the decision service, and wherein the client-side execution of the second strategy includes calling the second strategy in parallel to a call to the decision service of the service provider that executes the first strategy in response to a data processing request by one of the plurality of computing devices; and
    storing the second strategy in a data repository accessible by a plurality of computing devices.

11. The method of claim 10, further comprising:
    creating, prior to the generating, the first strategy server-side by the service provider.

12. The method of claim 10, wherein the client-side execution of the second strategy includes determining the failure of the decision service of the service provider that executes the first strategy based on the call in parallel to the decision service.

13. The method of claim 10, wherein, prior to the generating the second strategy, the method further comprises:
determining at least one available pathway of the plurality of pathways for executing the first strategy based on the available data and the required data by the one or more data processing nodes in each of the plurality of pathways,
wherein the second strategy is generated based further on the at least one available pathway.

14. The method of claim 13, wherein the at least one available pathway is determined based further on one or more corresponding data processing nodes using the available data, and wherein the available data is determined for a current time that the one or more computing resources are callable using the API specification.

15. The method of claim 10, wherein the one or more data processing nodes comprise components of the first strategy and that provide a processing result of the first strategy for requests by the plurality of computing devices.

16. A non-transitory machine-readable medium having stored thereon machine-readable instructions executable to cause a machine to perform operations comprising:
parsing a strategy utilized for processing a data processing request from a computing device by a decision service of a service provider system, wherein the strategy comprises a plurality of pathways for an execution of the strategy, each of the plurality of pathways including one or more data processing nodes for required data by each of the plurality of pathways during the execution of the strategy;
determining, based on the parsing, the required data for each of the plurality of pathways;
determining available data to the decision service from one or more additional services that are callable using an application programming interface (API) specification associated with the decision service;
identifying a first pathway of the plurality of pathways available to be used for the strategy based on the available data and the required data for each of the plurality of pathways;
creating a new strategy executable client-side by the computing device during a failure associated with the decision service at the service provider system;
storing the new strategy in a data repository available to the computing device;
determining the failure of the decision service has occurred;
receiving, from the computing device, a result of processing the new strategy client-side by the computing device, wherein the result is determined based on an artificial intelligence (AI) model for an application on the computing device; and
processing the data processing request by the decision service using at least the result.

17. The non-transitory machine-readable medium of claim 16, wherein the operations further comprise:
determining a second pathway of the plurality of pathways available to be used for the strategy based on the available data and the required data,
wherein the new strategy is created to include the first pathway and the second pathway as alternate pathways for processing the new strategy by the computing device in place of the decision service processing the strategy.

18. The non-transitory machine-readable medium of claim 16, wherein the processing the data processing request by the decision service using at least the result comprises continuing with a pathway that executes the strategy after completing one or more nodes in the pathway using the result from the computing device.

19. The non-transitory machine-readable medium of claim 16, wherein the storing the new strategy comprises:
packaging the new strategy in a data structure storable by the data repository, wherein the packaging includes stitching the first pathway with any second pathways available to be used for the strategy based on the available data and the required data.

20. The non-transitory machine-readable medium of claim 16, wherein the storing the new strategy is in response to one of an initiation of the decision service or a refresh of the decision service with an application on the computing device.

* * * * *